United States Patent
Klein et al.

(10) Patent No.: US 9,764,762 B2
(45) Date of Patent: Sep. 19, 2017

(54) ROTARY PIVOT ARM POSITIONING ASSEMBLY

(71) Applicant: GOMACO Corporation, Ida Grove, IA (US)

(72) Inventors: Kevin L. Klein, Denison, IA (US); Mark W. Brenner, Ida Grove, IA (US); Steven A. Johnson, Ida Grove, IA (US)

(73) Assignee: GOMACO Corporation, Ida Grove, IA (US)

( * ) Notice: Subject to any disclaimer, the term of this patent is extended or adjusted under 35 U.S.C. 154(b) by 58 days.

(21) Appl. No.: 14/711,613

(22) Filed: May 13, 2015

(65) Prior Publication Data

US 2016/0244096 A1  Aug. 25, 2016

Related U.S. Application Data

(60) Provisional application No. 61/992,641, filed on May 13, 2014.

(51) Int. Cl.
| | |
|---|---|
| *E01C 19/00* | (2006.01) |
| *B62D 11/20* | (2006.01) |
| *B62D 55/06* | (2006.01) |
| *B62D 55/065* | (2006.01) |

(52) U.S. Cl.
CPC .............. *B62D 11/20* (2013.01); *B62D 55/06* (2013.01); *B62D 55/0655* (2013.01); *E01C 19/00* (2013.01); *E01C 2301/00* (2013.01)

(58) Field of Classification Search
CPC .......... E01C 19/00; E01C 19/42; E01C 19/22; E01C 19/48; E01C 2301/00; B62D 55/06; B62D 55/084; B62D 11/20
See application file for complete search history.

(56) References Cited

U.S. PATENT DOCUMENTS

| | | | |
|---|---|---|---|
| 4,854,769 A | 8/1989 | Fukukawa et al. | |
| 4,900,186 A * | 2/1990 | Swisher, Jr. ............ | E01C 19/48 404/104 |
| 5,590,977 A * | 1/1997 | Guntert ................ | B62D 55/065 404/101 |
| 6,481,923 B1 * | 11/2002 | Casters ................... | E01C 19/40 404/104 |
| 6,481,924 B1 * | 11/2002 | Smolders ................. | B62D 7/02 180/408 |
| 6,872,028 B2 * | 3/2005 | Aeschlimann .......... | E01C 19/40 404/101 |
| 8,459,898 B2 * | 6/2013 | Guntert, Jr. ............. | E01C 19/42 180/411 |
| 2003/0072613 A1 * | 4/2003 | Colvard ................. | B62D 7/026 404/105 |
| 2007/0152427 A1 * | 7/2007 | Olsen ..................... | A61G 5/046 280/649 |
| 2009/0152828 A1 * | 6/2009 | Bebernes ................. | B62D 5/09 280/86 |
| 2010/0021234 A1 * | 1/2010 | Willis .................... | B62D 7/026 404/90 |
| 2011/0018230 A1 * | 1/2011 | Roose .................... | B62D 12/00 280/400 |

(Continued)

OTHER PUBLICATIONS

PCT International Search Report for Application No. PCT/US2016/031833 dated Aug. 11, 2016, 7 pages.

*Primary Examiner* — Abigail A Risic
(74) *Attorney, Agent, or Firm* — Suiter Swantz pc llo

(57) ABSTRACT

A rotary pivot arm positioning assembly for a paving, texturing, or curing machine allows the machine to automatically transition from an operational orientation to a transport orientation without manual repositioning or disconnection of its components. The assembly includes a pivot arm coupled to both the front and aft ends of an end frame by a helical actuator, slew gear drive or other rotary actuator. The rotary actuator articulates each pivot arm, as well as the adjustable leg and steerable crawler connected to the pivot (Continued)

arm, through at least a 90-degree range. The end frame may be fixed to the left or right end of the machine. The assembly may additionally include a second helical actuator, slew gear drive or rotary actuator connecting each steerable crawler to the adjustable leg and configured to rotate the steerable crawler through a full 360 degrees.

15 Claims, 4 Drawing Sheets

(56) References Cited

U.S. PATENT DOCUMENTS

| | | | |
|---|---|---|---|
| 2011/0236129 A1* | 9/2011 | Guntert, Jr. | E01C 19/42 |
| | | | 404/72 |
| 2013/0000996 A1* | 1/2013 | Miller | B62D 7/02 |
| | | | 180/9.46 |
| 2014/0333115 A1* | 11/2014 | Berning | B62D 3/02 |
| | | | 299/10 |
| 2015/0083517 A1 | 3/2015 | Farr et al. | |
| 2015/0102570 A1* | 4/2015 | Slawson | B60G 17/005 |
| | | | 280/6.157 |
| 2015/0102571 A1* | 4/2015 | Slawson | B60G 3/01 |
| | | | 280/6.157 |
| 2015/0354148 A1 | 12/2015 | Dahm et al. | |
| 2015/0354150 A1* | 12/2015 | Dahm | E01C 19/4886 |
| | | | 404/84.05 |
| 2016/0137242 A1* | 5/2016 | Dahm | G05D 1/0891 |
| | | | 180/8.6 |
| 2016/0177517 A1* | 6/2016 | Engels | G06T 7/20 |
| | | | 404/75 |

* cited by examiner

ROTARY PIVOT ARM POSITIONING ASSEMBLY

CROSS-REFERENCE TO RELATED APPLICATIONS

The present application claims the benefit under 35 U.S.C. §119(e) of U.S. Provisional Patent Application Ser. No. 61/992,641 filed May 13, 2014, which application is herein incorporated by reference in its entirety.

TECHNICAL FIELD

Embodiments of the present invention are directed generally to the field of paving operations, and more particularly to actuation mechanisms enabling the automatic rotation of one or more pivoting arms of the end frame of a paver or similar machine for use in a paving train.

BACKGROUND

Paving machines may incorporate a paving kit, dowel bar inserter, texturing device, or other attachments and accessories secured to a framework that extends laterally across the roadway or surface being paved, generally perpendicular to the direction the machine travels during paving or texturing operations. The framework may be a modular framework incorporating multiple frame members which can be inserted or removed to quickly reconfigure the paving machine. The framework may support a diesel engine, electrical generator or other like power unit for propelling the machine or supplying power to accessories and components, and is generally supported at either end by an end car (ex.—end structure). Each end structure may in turn incorporate a leg (ex.—vertical support) at either end. For example, a four-track machine may include two end cars, one at either end of the main framework, and four legs, each end car having a leg connected at its front and rear.

Each leg may be connected to a steerable crawler which contacts the ground via a crawler track. The steerable crawlers may rotate via manual, hydraulic, electronic over hydraulic, or other like means of actuation in various combinations so that the paving machine may be steered while in operation or reconfigured to minimize the machine's width for safe transport along a road or highway. The steerable crawlers may be actuated in combinations depending on the desired steering mode. For example, a four-track machine may steer in front or rear steering mode, where both front or rear steerable crawlers turn in unison. In a coordinated steering mode, the two front crawlers may turn in a single direction and the two rear crawlers in the opposite direction to minimize turn radius. In a crab steering mode, all four crawlers may turn in unison to more easily orient the machine on line or position the machine on another vehicle for transport. In a rotation mode, the steerable crawlers may be positioned to allow the machine to rotate through a full 360 degrees within its own dimensions; for example, each opposing pair of crawlers may be rotated so that each crawler steers in the opposite direction from its opposing companion crawler (left front/right rear, right front/left rear). Alternatively, the vertical support and steerable crawler may be connected to an end structure through a pivot arm or leg capable of rotation around an axis defined by the point of connection. Each end structure may incorporate a pair of pivot arms (i.e., one connected to the front and rear legs), each of which couples the end structure a leg (and a steerable crawler connected thereto) and may additionally articulate the leg through a combination of actuators, turnbuckles, or other like devices.

A potential problem with this configuration occurs when the machine is converted from an operational configuration to a transport configuration that minimizes overall width. Generally, in an operational configuration all four steerable crawlers of a four-track machine will be oriented in the direction of the paving or texturing operation (i.e., perpendicular to the lateral framework of the machine) and in a transport configuration all four crawlers will be oriented in the direction of the lateral framework (i.e., rotated 90 degrees from an operational configuration) to minimize the overall width of the machine. In machines incorporating pivot arms to connect an end structure to vertical supports (ex.—legs), extension of the pivot arms beyond the plane defined by the outer edge of the end structure may require the hydraulic actuators or turnbuckles securing the pivot arms to the main framework or end structure to be repositioned or disconnected. This disconnection (and subsequent reconnection) can be a time consuming process, especially if the pivot arms, associated legs, and connected steerable tracks must then be rotated manually to a new position. It may therefore be desirable for a pivot arm assembly to allow greater flexibility of reconfiguration without the need to manually disconnect or reposition components.

SUMMARY

In a first aspect, embodiments of the present disclosure are directed to an apparatus for automatically changing the configuration of a paving machine configured to operate in a paving direction, the paving machine having a left end, a right end, and a framework connecting the left end and the right end, the framework transverse to the paving direction and having at least one power source fixed thereto. In one embodiment, at least one end frame extending parallel to the paving direction is removably couplable to either the left end or the right end and has a first end and a second end (ex.—a front end and an aft end). In one embodiment, the apparatus includes at least one pivot arm rotatably coupled to either the first end or the second end via at least one first rotary actuator coupled to the at least one power source, the at least one first rotary actuator being configured to articulate the at least one pivot arm through a first rotational angle of at least 90 degrees. In one embodiment, the apparatus includes at least one adjustable leg fixed to the at least one pivot arm opposite the at least one first rotary actuator, the at least one adjustable leg having a longitudinal axis. In one embodiment, the apparatus includes at least one steerable crawler coupled to the at least one adjustable leg, the at least one steerable crawler including at least one steering track configured for linear propulsion of the steerable crawler.

In a further aspect, embodiments of the present disclosure are directed to a paving machine configured to operate in a paving direction. In one embodiment, the paving machine has a left end, a right end, and a transverse framework connecting the left and the right end. In one embodiment, the transverse framework includes at least one power source fixed thereto and a control system coupled to the power source, the control system including at least one processor. In one embodiment, the paving machine includes two or more pivot arm assemblies including at least at least a left pivot arm assembly removably fixed to the left end and a right pivot arm assembly removably fixed to the right end. In one embodiment, each pivot arm assembly of the two or more pivot arm assemblies includes an end frame extending parallel to the paving direction and having a first end and a second end (ex.—a front end and an aft end). In one embodiment, each pivot arm assembly includes at least a first pivot arm rotatably coupled to the first end by a first rotary actuator coupled to the power source, the at least one first rotary actuator configured to articulate the first pivot arm through a first rotational angle of at least 90 degrees. In one embodiment, each pivot arm assembly includes a second pivot arm rotatably coupled to the second end by a second rotary actuator coupled to the power source, the at least one second rotary actuator configured to articulate the second pivot arm through a second rotational angle of at least 90 degrees. In one embodiment, each pivot arm assembly includes at least one adjustable leg fixed to each pivot arm opposite the first rotary actuator, the at least one adjustable leg having a longitudinal axis. In one embodiment, each pivot assembly includes a steerable crawler coupled to each adjustable leg, the steerable crawler including at least one steering track configured for linear propulsion of the paving machine.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The invention may be better understood by those skilled in the art by reference to the accompanying figures in which.

DETAILED DESCRIPTION

Features of the invention in its various embodiments are exemplified by the following descriptions with reference to the accompanying drawings, which describe the invention with further detail. These drawings depict only selected embodiments of the invention, and should not be considered to limit its scope in any way.

Figure 1:
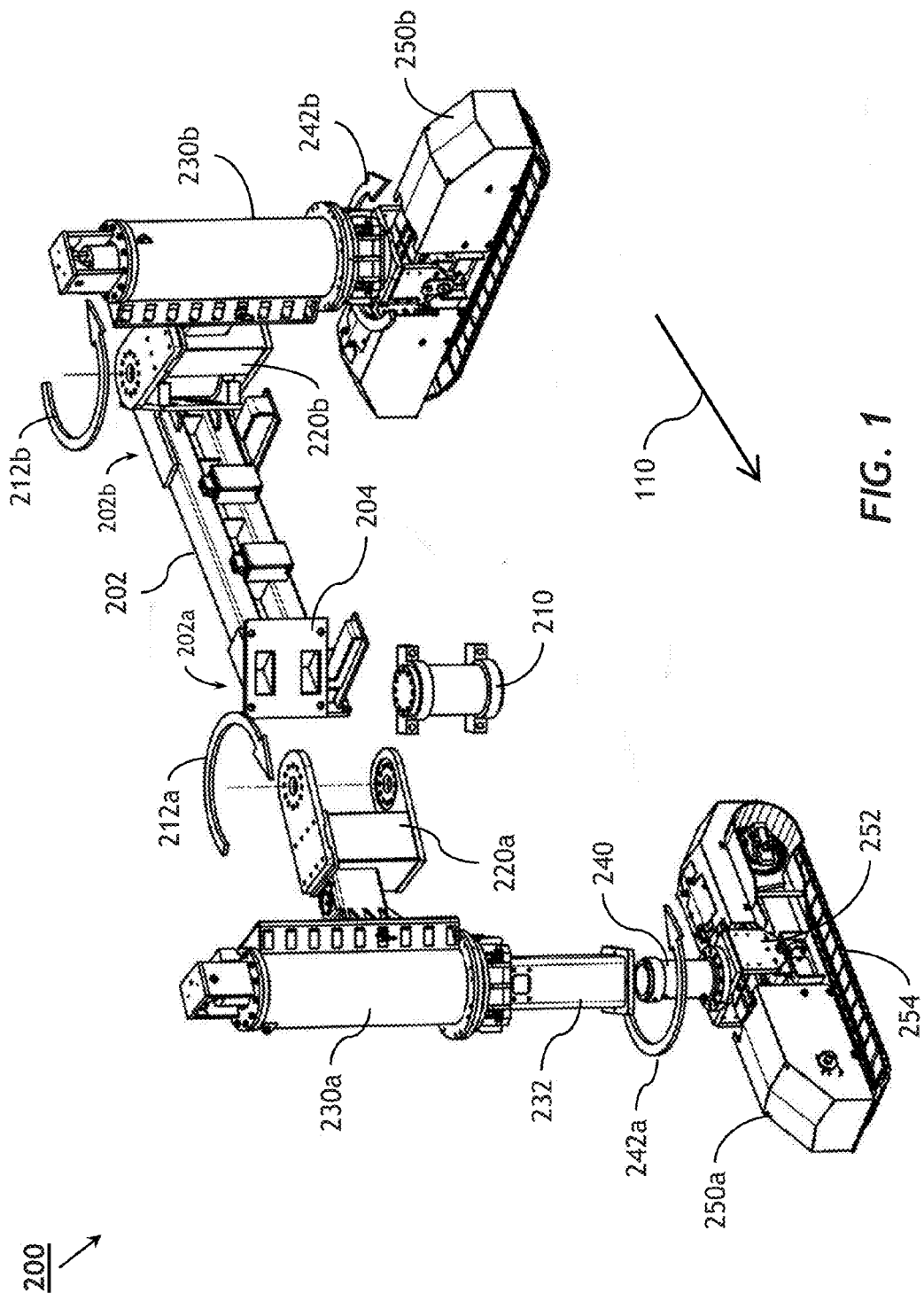
FIG. 1 illustrates an embodiment of a rotary pivot arm positioning assembly according to the inventive concepts disclosed herein.

Referring to FIG. 1, a pivot arm assembly 200 is shown. In one embodiment, a paving machine 100 having a left end and a right end defined by a transverse framework 102 (relative to the paving direction 110 in which the machine travels while in operational mode) includes a left pivot arm assembly 200 and a right pivot arm assembly 200. For example, the paving machine 100 may be a slipform paving machine, a concrete paving machine, a texturing machine, a spreader machine, a placer machine, a curing machine, or any similarly designed machine including two lateral end frames connected by a transverse framework. In addition, a paving machine 100 having four steerable crawlers 250 (e.g., two steerable crawlers each on its left and right sides) may include a left pivot arm assembly 200 fixed to the left end of the transverse framework and a right pivot arm assembly 200 fixed to the right end of the transverse framework. In one embodiment, a pivot arm assembly 200 includes an end frame (ex.—end structure) 202 extending parallel to the paving direction 110. For example, the end frame 202 may have a front end 202a and an aft end 202b, corresponding generally to the front and aft sides of the paving machine 100 when in operational mode. In one embodiment, a first rotary actuator 210 is fixed to the end frame 202 at both its front end and its aft end. For example, a hydraulic helical rotary actuator 210 may be fixed (ex.—bolted) to the front end 202a via bracket 204 and a helical rotary actuator 210 fixed to the aft end 202b via a similar bracket (not shown). In one embodiment, rotary actuator 210 is coupled to an onboard power source 106 (ex.—electrical battery, gasoline engine, diesel engine) mounted to the transverse framework 102 of paving machine 100 via cables, conduits, or any other appropriate connection.

In one embodiment, a first rotary actuator 210 defines a rotational axis 212 around which the pivot arm 220 is articulated. For example, rotary actuator 210 fixed to front end 202a via bracket 204 may define a rotational axis 212a and a rotary actuator (not shown) fixed to aft end 202b may similarly define a rotational axis 212b. In addition, pivot arm 220a may be pivotably coupled to the front end 202a via rotary actuator 210a. In one embodiment, the first rotary actuator 210 rotates the pivot arm 220a around rotational axis 212a. For example, paving machine 100 may travel in a paving direction 110 while in an operational mode, e.g., while paving, texturing, curing, or otherwise treating a target surface. The paving machine 100 may execute minor steering corrections based on user input or directions from its control system 104, but generally its direction of travel will be substantially parallel to paving direction 110. In one embodiment, adjustable legs 230a, 230b are fixed to pivot arms 220a, 220b opposite their respective rotary actuators 210; similarly, steerable crawlers 250a, 250b are pivotably fixed to the lower telescoping portions 232 of adjustable legs 230a, 230b. For example, front steerable crawler 250a is shown in an orientation consistent with an operational mode of the paving machine 100. For example, a paving machine 100 in operational mode may include two, four, or any appropriate number of steerable crawlers 250a oriented so that track 254 propels the paving machine 100 parallel to the paving direction 110. Aft steerable crawler 250b is shown in an orientation consistent with a transport mode of paving machine 100, whereby the overall width of the paving machine 100 is minimized to facilitate transport of the paving machine 100 aboard a flatbed or similar vehicle.

In one embodiment, the adjustable leg 230 and steerable crawler 250 connected to the pivot arm 220 rotate relative to rotational axis 212 when rotary actuator 210 is activated (e.g., by the control system 104 of paving machine 100). For example, a paving machine 100 including four steerable crawlers 250 (ex.—a left pivot arm assembly 200 and a right pivot arm assembly 200, each including a front steerable crawler 250a and an aft steerable crawler 250b) may transition between an operational mode and a transport mode by articulating the front and aft rotary actuators 210 of each pivot arm assembly 200 through a rotational arc of at least 90 degrees relative to rotational axis 212. Each steerable crawler 250 of the paving machine 100 may then be positioned substantially parallel to the paving direction 110 (as shown by steerable crawler 250a), substantially perpendicular to the paving direction 110, and thus substantially parallel to the transverse framework of paving machine 100 (as shown by steerable crawler 250b), or at any point in between without manual repositioning, disconnection, or reconnection of any component of the paving machine 100. In one embodiment, rotary actuator 210 is configured to articulate the pivot arm 220 around rotational axis 212 through a continuous range of up to 110 degrees (i.e., including 8-10 degrees of additional range on either side). For example, the rotational range of rotary actuator may include an operational-mode orientation (e.g., steerable crawler 250a) and a transport-mode orientation (e.g., steerable crawler 250b) with a margin of substantially 10 degrees in either direction.

Figure 2:
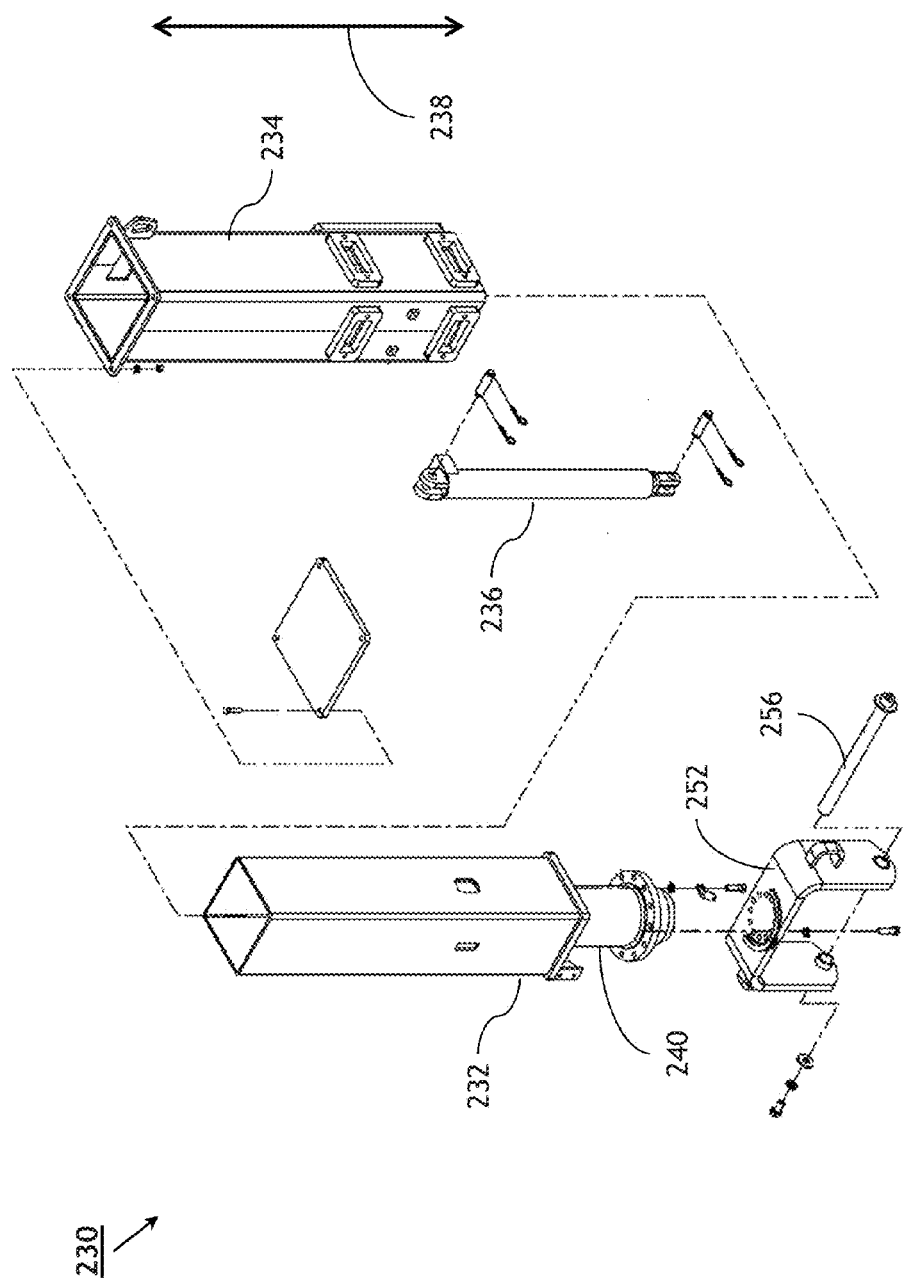
FIG. 2 illustrates an embodiment of an adjustable leg assembly according to the inventive concepts disclosed herein.

Referring to FIG. 2, in one embodiment an adjustable leg 230 of the paving machine 100 is configured to vertically articulate (ex.—raise or lower) the pivot arm assembly 200 or the paving machine 100. For example, adjustable leg 230 may include a first interior portion 232. In one embodiment, first interior portion (ex.—inner tube) 232 fits into a second interior portion (ex.—outer tube) 234 (flush with the barrel of adjustable leg 230) and houses a linear actuator 236. For example, linear actuator 236 may be a hydraulic cylinder or electro-hydraulic actuator, the rod end of which is fixed to the interior of the first interior portion 232 and the piston end of which is fixed to the interior of the second interior portion 234. Therefore, actuating linear actuator 236 may result in (1) raising the height of the second interior portion 234 (and, by extension, the adjustable leg 230 coupled thereto) from a minimum height consistent with the compressed length of linear actuator 236 or (2) lowering the height of the second interior portion 234 (and the adjustable leg 230) from a maximum height consistent with the maximum stroke length of linear actuator 236. As the paving machine 100 may include at least one pivot arm 220 (and, by extension, an end frame 202) connected to the adjustable leg 230, the paving machine 100 may increase or decrease its overall height above a paving surface through the synchronized actuation of multiple linear actuators 236 (e.g., via the control system 104 of the paving machine 100). In one embodiment, referring also to FIG. 1, a paving machine 100 raises a single steerable crawler 250a above ground level by retracting the linear actuator 236 (not shown) housed in the respective adjustable leg 230a. For example, a paving machine 100 having four steerable crawlers 250 may individually raise each steerable crawler 250 (via the appropriate linear actuator 236) and individually reposition each steerable crawler 250 by articulating the appropriate rotary actuator 210, pivot arm 220, and adjustable leg 230.

In one embodiment, referring to FIG. 1, each steerable crawler 250 of the pivot arm assembly 200 is pivotably coupled to an adjustable leg 230 (via first interior portion 232) by a second rotary actuator 240. For example, second rotary actuator 240 may articulate a connected steerable crawler 250a through a full 360 degrees around a rotational axis 242a defined by adjustable leg 230a. In one embodiment, the paving machine 100 coordinates (e.g., through an onboard control system 104) the rotation of steerable crawler 250a by the second rotary actuator 240 with the rotation of pivot arm 220a by rotary actuator 210. For example, as the first rotary actuator 210 rotates pivot arm 220a (and, by extension, adjustable leg 230a and steerable crawler 250a) from an operational orientation (as shown by pivot arm 220a, substantially parallel to end frame 202) to a transport orientation (as shown by pivot arm 220b, substantially perpendicular to end frame 202), the second rotary actuator may simultaneously rotate steerable crawler 250a, maintaining the steerable crawler 250a in an orientation substantially parallel to the end frame 202.

Figure 3:
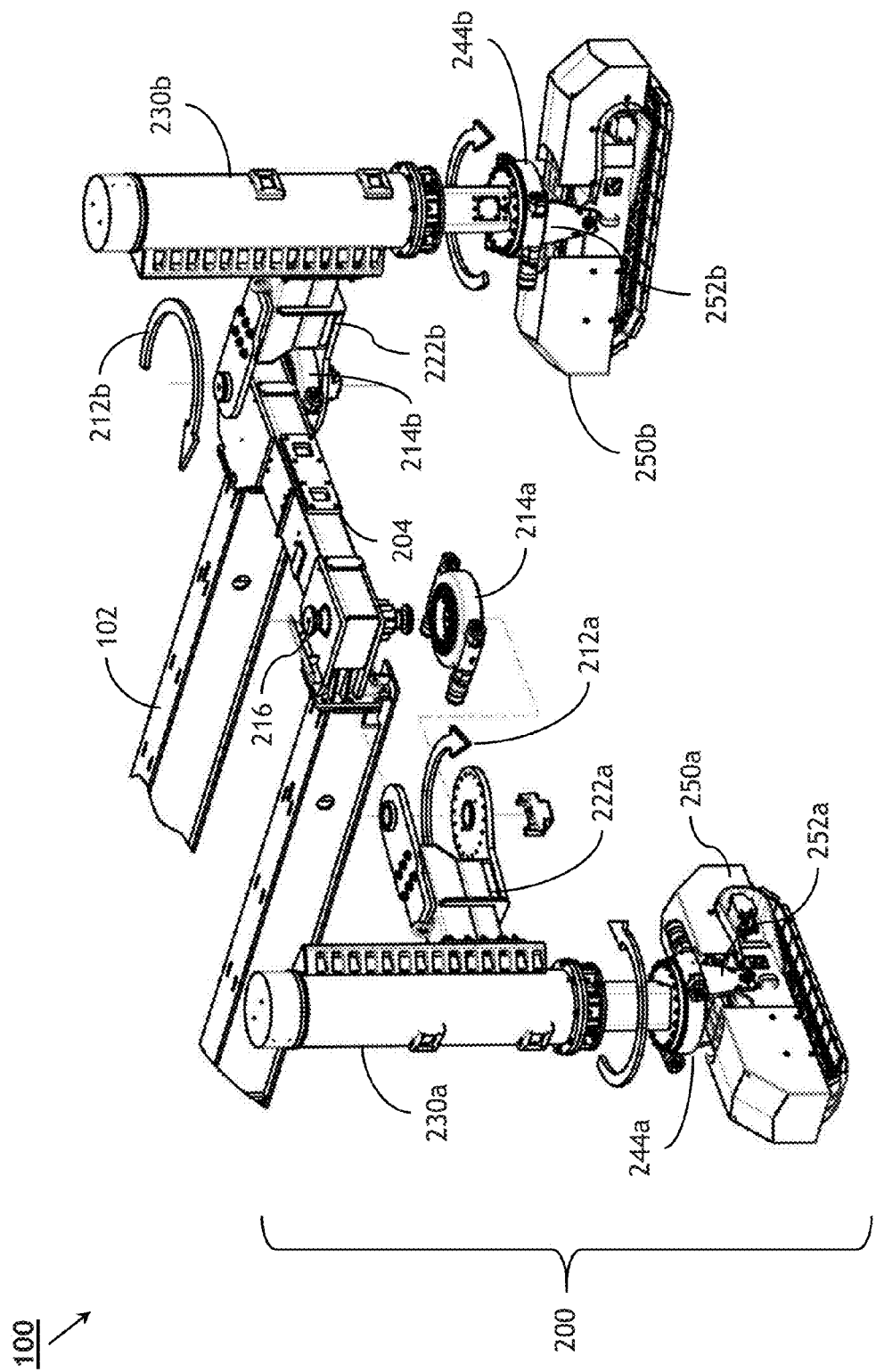
FIG. 3 illustrates an embodiment of an embodiment of a rotary pivot arm positioning assembly for a paving machine according to the inventive concepts disclosed herein.

Referring to FIG. 3, in one embodiment one or more of the first rotary actuators connecting pivot arms to the end frame of pivot arm assembly 200 include slew gear drives 214. For example, slew gear drives 214a and 214b may articulate pivot arms 222a and 222b (and, by extension, adjustable legs 230a/230b and steerable crawlers 250a/250b) through rotational axes 212a and 212b around pivot pins 216. Pivot pins 216 are mounted to either end of the end frame 202, which in turn is fixed to one end of the transverse framework 102 of paving machine 100. In one embodiment, one or more of the second rotary actuators 240 connecting the steerable crawlers and adjustable legs of pivot arm assembly 200 include slew gear drives 244. For example, slew gear drives 244a and 244b may respectively articulate track mount yokes 252a and 252b. Track mount yokes 252a and 252b may in turn be mounted to steerable crawlers 250a and 250b, which rotate along with yokes 252a/252b. In one embodiment, slew gear drives 244a, 244b are configured to rotate steerable crawlers 250a, 250b through a full 360 degrees.

Figure 4:
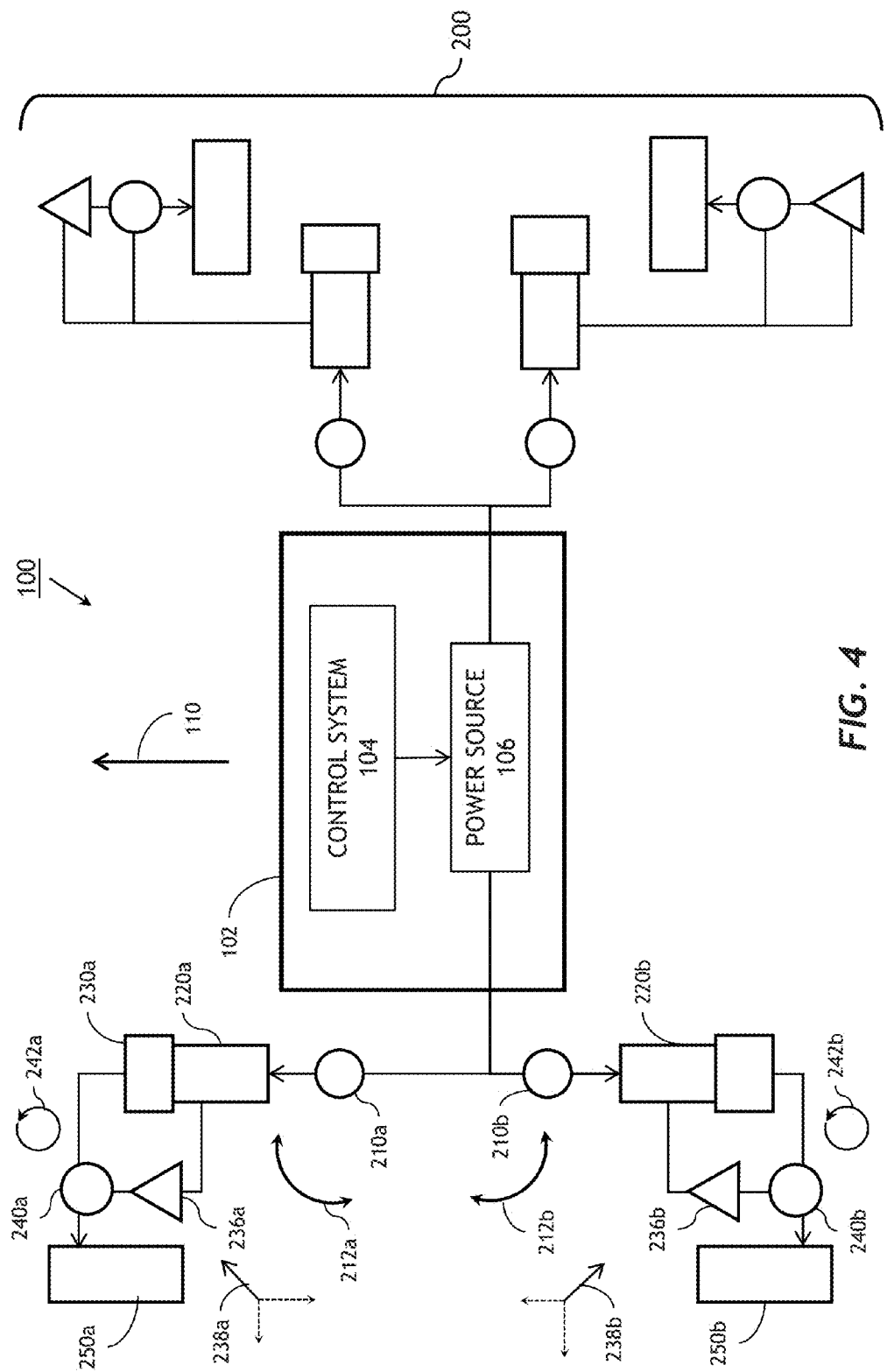
FIG. 4 is a block diagram of a paving machine incorporating a rotary pivot arm positioning assembly for a paving machine according to the inventive concepts disclosed herein.

Referring to FIG. 4, in one embodiment a paving machine 100 may include two rotary pivot arm positioning assemblies 200 according to the inventive concepts disclosed herein. For example, the left and right sides of a paving machine 100 (relative to paving direction 110, and fixed to either side of transverse framework 102) may incorporate a left and right pivot arm positioning assembly 200. In one embodiment, the control system 104 of paving machine 100, in conjunction with onboard power source 106, may steer, reposition, or reconfigure the paving machine 100 by distributing power to components of pivot arm assembly 200. For example, rotary actuators 210a, 210b (which may include slew gear drives 214a, 214b (not shown)) may articulate pivot arms 220a, 220b (and by extension adjustable legs 230a, 230b) through rotational angles 212a, 212b of at least 90 degrees. Additionally, rotary actuators 240a, 240b (which may include slew gear drives 244a, 244b (not shown)) may rotate steerable crawlers 250a, 250b through a rotational range of 360 degrees (242a, 242b). Furthermore, the linear actuators 236a, 236b housed in adjustable legs 230a, 230b may raise or lower (along z-axis 238a, 238b relative to paving direction 110) the pivot arm assemblies 200 and transverse framework 102 of paving machine 100.

Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected", or "coupled", to each other to achieve the desired functionality, and any two components capable of being so associated can also be viewed as being "couplable", to each other to achieve the desired functionality. Specific examples of couplable include but are not limited to physically mateable and/or physically interacting components and/or wirelessly interactable and/or wirelessly interacting components and/or logically interacting and/or logically interactable components.

While particular aspects of the subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

We claim:

1. An apparatus for automatically changing the configuration of a paving machine configured to operate in a paving direction, the paving machine having a left end, a right end, and a framework connecting the left end and the right end, the framework transverse to the paving direction and having at least one power source fixed thereto, the apparatus comprising:
   at least one end frame removably couplable to either the left end or the right end, the at least one end frame extending parallel to the paving direction and having a first end and a second end;
   at least one pivot arm rotatably coupled to the first end or the second end via at least one first rotary actuator coupled to the at least one power source, the at least one first rotary actuator configured to articulate the at least one pivot arm through a first rotational angle of 106 to 110 degrees;
   at least one adjustable leg fixed to the at least one pivot arm opposite the at least one first rotary actuator, the at least one adjustable leg having a longitudinal axis; and
   at least one steerable crawler coupled to the at least one adjustable leg, the at least one steerable crawler including at least one steering track configured for linear propulsion of the steerable crawler.

2. The system of claim 1, wherein the first rotational angle includes at least:
   a first position wherein the at least one pivot arm extends parallel to the at least one end frame; and
   a second position wherein the at least one pivot arm extends perpendicular to the at least one end frame.

3. The system of claim 1, wherein the at least one first rotary actuator includes at least one of a helical actuator and a slew ring drive.

4. The system of claim 1, wherein the at least one steerable crawler is rotatably coupled to the at least one adjustable leg by at least one second rotary actuator, the at least one second rotary actuator configured to articulate the at least one steerable crawler through a second rotational angle around the longitudinal axis.

5. The system of claim 4, wherein the second rotational angle is 360 degrees.

6. The system of claim 4, wherein the at least one second rotary actuator includes at least one of a helical actuator and a slew ring drive.

7. The system of claim 1, wherein the at least one adjustable leg includes at least one linear actuator configured to articulate the at least one adjustable leg through a vertical range along the longitudinal axis.

8. The system of claim 7, wherein the at least one linear actuator includes at least one of a hydraulic cylinder and an electro-hydraulic actuator.

9. A paving machine configured to operate in a paving direction, the paving machine having a left end, a right end, and a transverse framework connecting the left and the right end, the transverse framework including (1) at least one power source fixed thereto and (2) a control system coupled to the power source, the control system including at least one processor, the paving machine comprising:
   two or more pivot arm assemblies including at least at least a left pivot arm assembly removably fixed to the left end and a right pivot arm assembly removably fixed to the right end, each pivot arm assembly of the two or more pivot arm assemblies including:
      an end frame having a first end and a second end, the end frame extending parallel to the paving direction;
      two or more pivot arms including at least (1) a first pivot arm rotatably coupled to the first end by a first rotary actuator coupled to the power source, the at least one first rotary actuator configured to articulate the first pivot arm through a first rotational angle of 106 to 110 degrees, and (2) a second pivot arm rotatably coupled to the second end by a second rotary actuator coupled to the power source, the at least one second rotary actuator configured to articulate the second pivot arm through a second rotational angle of 106 to 110 degrees;
      at least one adjustable leg fixed to each pivot arm of the two or more pivot arms opposite the first rotary actuator, the at least one adjustable leg having a longitudinal axis; and
      a steerable crawler coupled to the at least one adjustable leg, the steerable crawler including at least one steering track configured for linear propulsion of the paving machine.

10. The paving machine of claim 9, wherein the paving machine includes at least one of a slipform paving machine, a concrete paving machine, a texturing machine, a spreader machine, a placer machine, and a curing machine.

11. The paving machine of claim 9, wherein the at least one power source includes at least one of a gasoline engine, a diesel engine, and an electric battery.

12. The paving machine of claim 9, wherein:
   the first rotational angle includes at least a first position wherein the first pivot arm extends parallel to the end frame and a second position wherein the first pivot arm extends perpendicular to the end frame; and
   the second rotational angle includes at least a third position wherein the second pivot arm extends parallel to the end frame and a fourth position wherein the second pivot arm extends perpendicular to the end frame.

13. The paving machine of claim 9, wherein the at least one first rotary actuator and the at least one second rotary actuator include at least one of a helical actuator and a slew ring drive.

14. The paving machine of claim 9, wherein the at least one steerable crawler is rotatably coupled to the at least one adjustable leg by at least one third rotary actuator coupled to the at least one power source, the at least one third rotary actuator configured to articulate the at least one steerable crawler through a third rotational angle around the longitudinal axis of the at least one adjustable leg.

15. The paving machine of claim 14, wherein the third rotational angle is 360 degrees.

* * * * *